(12) United States Patent
Malloy et al.

(10) Patent No.: US 8,528,456 B2
(45) Date of Patent: Sep. 10, 2013

(54) COATED TEXTILE SLEEVE AND METHOD OF CONSTRUCTION THEREOF

(75) Inventors: Cassie Malloy, Bluebell, PA (US); Ramesh R. Avula, Phoenixville, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 0 days.

(21) Appl. No.: 13/523,405

(22) Filed: Jun. 14, 2012

(65) Prior Publication Data
US 2013/0000471 A1    Jan. 3, 2013

Related U.S. Application Data

(60) Provisional application No. 61/496,617, filed on Jun. 14, 2011.

(51) Int. Cl.
*D04C 1/02*      (2006.01)

(52) U.S. Cl.
USPC ...................................................... 87/1; 87/8

(58) Field of Classification Search
USPC ...................... 87/1, 8, 9, 13, 33, 62
See application file for complete search history.

(56) References Cited

U.S. PATENT DOCUMENTS

| | | | |
|---|---|---|---|
| 3,692,375 A * | 9/1972 | Matt et al. | 384/298 |
| 3,913,625 A | 10/1975 | Gazda et al. | |
| 4,754,685 A | 7/1988 | Kite et al. | |
| 4,915,762 A * | 4/1990 | Berlincourt et al. | 156/143 |
| 5,032,199 A * | 7/1991 | Landry et al. | 156/149 |
| 5,683,773 A | 11/1997 | Kemper | |
| 6,602,565 B1 | 8/2003 | Katayama et al. | |
| 6,838,512 B2 | 1/2005 | Eggers et al. | |
| 6,924,005 B2 * | 8/2005 | Saylor et al. | 427/427.5 |
| 6,949,277 B2 | 9/2005 | Bhattacharyya | |
| 6,982,378 B2 | 1/2006 | Dickson | |
| 7,074,470 B2 * | 7/2006 | Niwa | 428/36.3 |
| 7,228,877 B2 | 6/2007 | Shifman | |
| 7,384,490 B2 * | 6/2008 | Nishikawa | 156/79 |
| 7,576,286 B2 | 8/2009 | Chen | |
| 7,758,937 B2 | 7/2010 | Gong et al. | |
| 7,874,184 B2 | 1/2011 | Malloy et al. | |
| 2003/0085004 A1 * | 5/2003 | Witherell et al. | 160/330 |
| 2003/0134956 A1 * | 7/2003 | Saylor et al. | 524/423 |

(Continued)

FOREIGN PATENT DOCUMENTS

| | | |
|---|---|---|
| RU | 2199560 | 7/2001 |
| WO | 2010028201 A2 | 3/2010 |

OTHER PUBLICATIONS

International Search Report PCT/US2012/042454 mailed on Sep. 20, 2012.

*Primary Examiner* — Shaun R Hurley
(74) *Attorney, Agent, or Firm* — Robert L. Stearns; Dickinson Wright, PLLC

(57) ABSTRACT

A textile sleeve and method of construction thereof is provided. The textile sleeve has a water-based, impervious coating for protecting elongate members contained within the sleeve. The sleeve has a flexible, tubular wall of tightly braided yarns with a coating applied thereto to render the wall impervious to fluid. The coating is a water-based coating applied as two distinct, first and second layers. The first, underlying layer includes a dielectric enhancing additive and a thickening agent to enhance the impermeability of the wall. The second, outer layer contains a similar formulation as the underlying first layer, however, it is free of the thickening agent.

17 Claims, 2 Drawing Sheets

(56) References Cited

U.S. PATENT DOCUMENTS

| | | | |
|---|---|---|---|
| 2005/0011344 A1* | 1/2005 | Hess | 87/5 |
| 2005/0074685 A1* | 4/2005 | Kido et al. | 430/110.2 |
| 2005/0076996 A1* | 4/2005 | Nishikawa | 156/154 |
| 2005/0170274 A1* | 8/2005 | Matsumura et al. | 430/126 |
| 2009/0126820 A1 | 5/2009 | Thomas et al. | |
| 2009/0246434 A1 | 10/2009 | Miyamoto et al. | |
| 2010/0018600 A1 | 1/2010 | Crouse et al. | |
| 2010/0108173 A1 | 5/2010 | Hayes | |
| 2010/0316822 A1 | 12/2010 | Malloy | |
| 2011/0021649 A1* | 1/2011 | Sakuma et al. | 521/55 |

* cited by examiner

COATED TEXTILE SLEEVE AND METHOD OF CONSTRUCTION THEREOF

CROSS-REFERENCE TO RELATED APPLICATIONS

This application claims the benefit of U.S. Provisional Application Ser. No. 61/496,617, filed Jun. 14, 2011, which is incorporated herein by reference in its entirety.

BACKGROUND OF THE INVENTION

1. Technical Field

This invention relates generally to textile sleeves for protecting elongate members, and more particularly to textile sleeves having an impervious coating.

2. Related Art

Tubular textile sleeves are known for use to provide protection to internally contained elongate members, such as a wire harness, fluid or gas conveying tubes, or cable, for example. Some protective sleeve applications must meet specific performance requirements, such as military applications where the protective sleeves must meet nuclear, biological, chemical contamination survivability. Other applications that have stringent performance requirements include commercial aircraft applications, for example, which require the sleeves to meet a high level of fluid resistance so that the fluids remain out of contact with the elongate members contained in the sleeve. In order to meet some of the stringent requirements of these and other applications, it is known to apply a separate outer covering layer about textile sleeves, such as an impervious sheet of polymeric material, however, this comes at a cost in manufacture and adds weight to the sleeve assembly. Further yet, it is known to apply solvent-based coatings to an outer surface of a textile sleeve to provide enhanced abrasion resistance and to further render the sleeve impervious. However, the known solvent-based coatings are typically not environmentally friendly and can be difficult to work with in manufacture. In addition, the known coating processes used to apply the solvent-based coatings do not reliably render the sleeve wall impervious, thereby allowing fluid to leak through the sleeve wall. Further products used to provide protection about elongate members include heat-shrink wrapping. Although the heat-shrink wrap materials can be effective in providing fluid tight protection, they are generally costly and rigid upon being heat-set, thereby making them difficult to route about sharp corners and bends.

SUMMARY OF THE INVENTION

A textile sleeve having a water-based, impervious coating is provided for protecting elongate members contained within the sleeve. The sleeve has a flexible, tubular wall of tightly braided yarns with a coating applied thereto to render the wall impervious to fluid. The coating is a water-based coating applied in two distinct, first and second layers. The first, underlying layer includes a dielectric enhancing additive and a thickening agent to enhance the impermeability of the wall. The second, outer layer contains a similar formulation as the underlying first layer, however, it does not contain a thickening agent.

In accordance with another aspect of the invention, the braid is formed having a pick-per-inch between about 15-25.

In accordance with another aspect of the invention, the braid is formed having a pick-per-inch between about 17-20.

In accordance with another aspect of the invention, the tubular wall is braided from high temperature yarn, such as nomex or some other high temperature rated polymeric yarn material.

In accordance with another aspect of the invention, the water-based coating is a fluorolatex material.

In accordance with another aspect of the invention, the dielectric enhancing additive is barium sulfate.

In accordance with another aspect of the invention, the outer layer of coating is post-cured.

In accordance with another aspect of the invention, a method of constructing a textile sleeve is provided. The method includes braiding a tubular wall and applying a water-based coating to the wall. Application of the water-based coating includes applying a first layer having a dielectric enhancing additive and a thickening agent to enhance the impermeability of the wall. Then, after applying the first layer, applying a second layer containing a similar formulation as the underlying first layer, however, being free of a thickening agent. Then, post-curing the coating.

In accordance with another aspect of the method of construction, the braiding includes forming a pick-per-inch between about 15-25.

In accordance with another aspect of the method of construction, the braiding includes forming a pick-per-inch between about 17-20.

In accordance with another aspect of the method of construction, the braided yarn is provided as a high temperature yarn, such as nomex or some other high temperature rated polymeric yarn material.

In accordance with another aspect of the method of construction, the water-based coating is provided as a fluorolatex material.

In accordance with another aspect of the method of construction, the dielectric enhancing additive is provided as barium sulfate.

In accordance with another aspect of the method of construction, the level of cross-linker in the coating is provided as 10×.

In accordance with another aspect of the method of construction, the first layer is applied as a wet film thickness of about 0.015".

In accordance with another aspect of the method of construction, the first layer is dried prior to applying the second layer.

In accordance with another aspect of the method of construction, the braided yarn is heat-treated prior to applying the first layer of coating to remove loose strands which ultimately enhances decontamination of the sleeve upon being exposed to potentially harmful agents during use and further enhances the dielectric and abrasion resistance properties of the finished sleeve by enhancing the adhesion of the coating material to the braided yarn.

In accordance with another aspect of the method of construction, the heat-treating is performed by passing the braided sleeve through a flame.

In accordance with another aspect of the method of construction, the post-curing is performed at about 200 degrees Celsius for about 12 hours.

BRIEF DESCRIPTION OF THE DRAWINGS

These and other aspects, features and advantages of the invention will become readily apparent to those skilled in the art in view of the following detailed description of the presently preferred embodiments and best mode, appended claims, and accompanying drawings, in which:

DETAILED DESCRIPTION OF PREFERRED EMBODIMENTS

Figure 1:
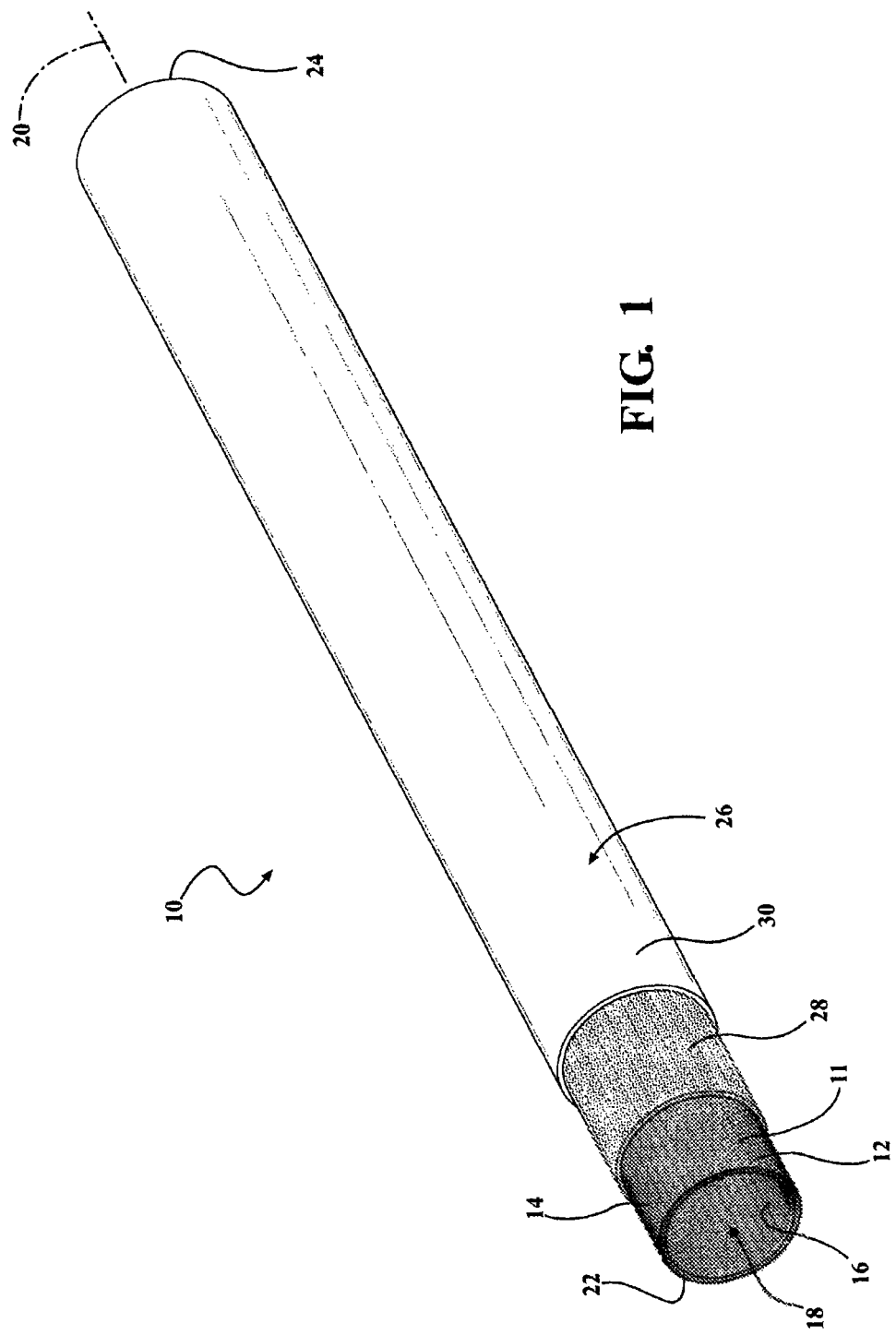
FIG. 1 is a schematic, partially broken-away perspective view of a protective textile sleeve having a coating constructed in accordance with one aspect of the invention.

Referring in more detail to the drawings, FIG. 1 shows a coated, tubular textile sleeve 10 constructed according to one embodiment of the invention. The textile sleeve 10 includes a plurality of yarns 11 interlaced with one another via a tubular braiding process to form a tubular wall 12. The tubular wall 12 is braided in seamless fashion and thus, is circumferentially continuous having an outer surface 14 and an inner surface 16 defining a circumferentially enclosed cavity 18 extending axially along a central longitudinal axis 20 between open opposite ends 22, 24 of the sleeve 10. The cavity 18 is sized as desired during construction for receipt of an elongate member to be protected, such as a wire harness, fluid or gas conveying conduit, cable or the like. The wall 12 has an outer coating 26 applied thereto to render the wall 12 impervious to fluid. The coating 26 is a water-based coating (provided as a fluorolatex material, Solvay Solexis TN latex) applied as two distinct, first and second layers 28, 30 (shown separate from one another for illustration purposes, though the underlying first layer 28 is not visible upon application of the second layer 30 over the first layer 28) to enhance the impermeability of the wall 12. The underlying first layer 28 includes a base material, a dielectric enhancing additive, a thickening agent, and a cross-linker. The second, outer layer 30 contains a similar formulation as the underlying first layer 28, however, in order to provide the outer surface finish with the desired smooth surface finish, thereby enhancing the ability to decontaminate the sleeve 10 upon being exposed to potentially harmful gas, liquid or chemical agents, the outer layer 30 does not include the thickening agent, but otherwise it is the same. The coated sleeve 10 is particularly useful for applications requiring nuclear, biological, and chemical contamination survivability, including decontamination (cleaning upon being exposed to potentially harmful agents), such as may be encountered in military applications. Further, the sleeve 10 is well suited for aircraft applications, such as commercial aircraft, for example.

The wall 14 can be constructed having any suitable length and diameter, as desired for the intended application, and is braided having a tight braid structure to enhance the impermeability of the wall 12. In accordance with one aspect of the invention, the braid is formed having a pick-per-inch between about 15-25, and more preferably having a pick-per-inch between about 17-20. In addition to the tight braid structure defined above, the wall 14 is braided including yarn filaments capable of withstanding high temperatures, such as Nomex or some other high temperature rated polymeric yarn material.

Then, upon braiding the wall 12, the wall 12 is heat-treated to remove any loose yarn fibers and binders within the yarn filaments used to facilitate the initial construction of the yarn. By removing the loose filaments, the outer surface 14 is smoothed, thereby enhancing the smooth and encapsulating application of the coating 26 to the wall 12, thus, improving the performance of the finished sleeve 10, such as by enhancing the ability to decontaminate the sleeve 10 upon being exposed to potentially harmful agents during use. Further, the removal of the binder from the yarn enhances the adhesion of the coating 26 to the outer surface 14, thereby enhancing the dielectric and abrasion resistant properties of the sleeve 10.

The water-based coating 26 is modified to provide the properties and function in the applications discussed above. The modification is performed via introduction of barium sulfate to increase the dielectric properties. In addition, a compatible thickening agent, such as a gum-type thickening agent, e.g. sodium polyacrylate, sold under the trademark Alcogum® 296-W, is added to the coating used to form the first layer 28 to enhance the coverage of the first layer 28 on the outer surface 14 of the wall 12. Further, the level of cross-linker in the coating 26 is increased from a standard 2.5× to 10× to allow the coating 26 to be process in a hot air tower and to be applied as a wet film having a thickness of about 0.015" using a cross-head and round die. The enhanced cross-linker, which is added as a homogenous mixture containing no precipitate, provides an acceleration of the steady state cure to provide a fully cross-linked coating, which is not attainable without the increased cross-linker, and thus, would lead to a finished product that is not as resistant to chemical attack. The coating material flows into the cross-head under the force of gravity and is then dried in hot air less than 200 degrees Fahrenheit. Then, the coating 26 is post cured at a specified temperature over a predetermined time to provide the improved abrasion resistance.

Figure 2:
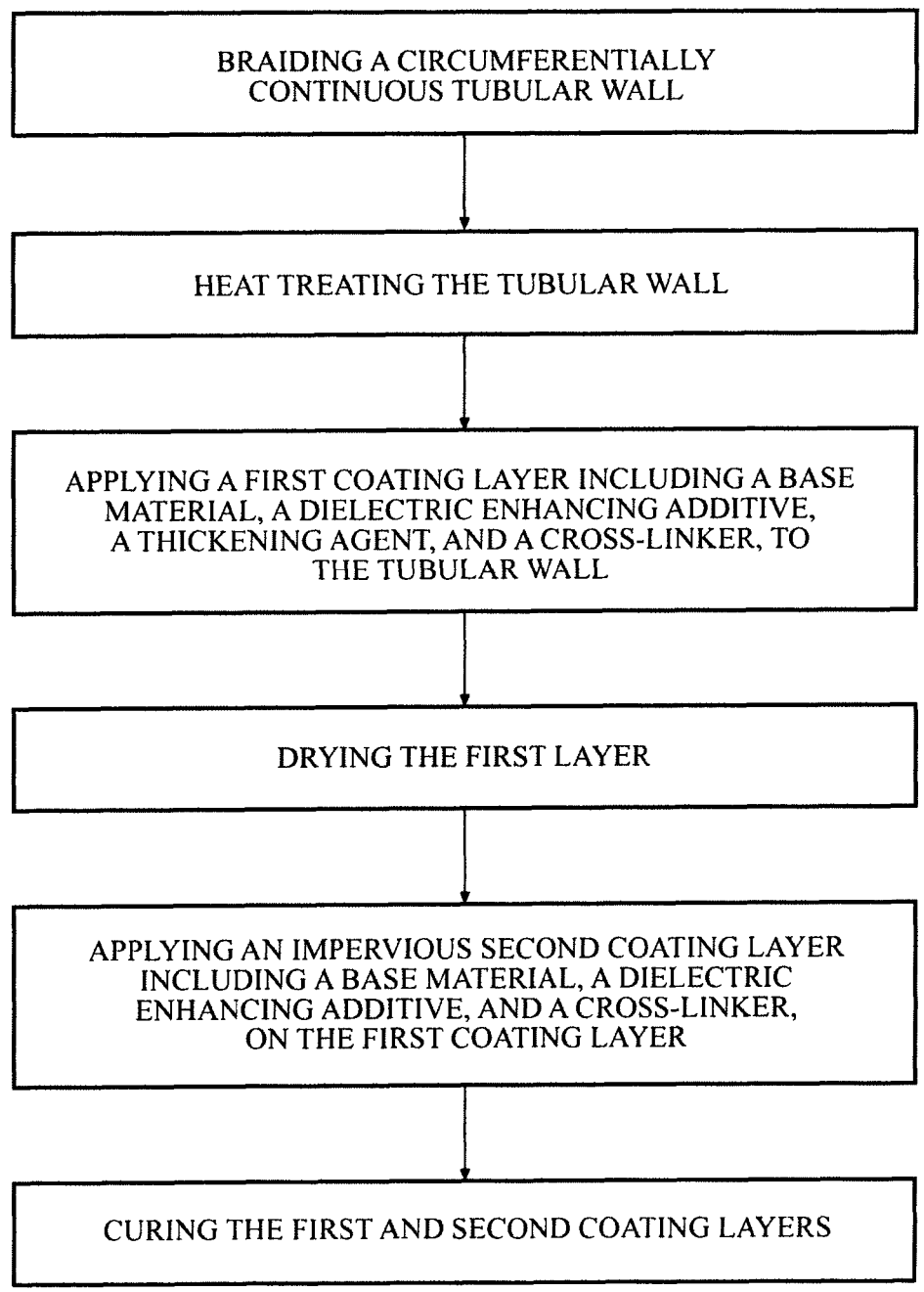
FIG. 2 is a flow diagram detailing steps used in the construction of the sleeve of FIG. 1.

In accordance with another aspect of the invention, a method of constructing a textile sleeve 10 is provided, such as illustrated in FIG. 2. The method includes braiding a tubular wall 12 and ultimately applying a water-based coating 26 to the wall 12. Application of the water-based coating 26 includes applying a first layer 28 to the outer surface 14 of the wall 12, wherein the first layer 28 includes a base material, a dielectric enhancing additive, a cross-linker, and a thickening agent (the thickening agent enhances the impermeability of the coating 26). Then, after applying the first layer 28, applying a second layer 30 containing the same formulation as the underlying first layer 28, however, being free of the thickening agent in order to provide the necessary smooth surface finish to facilitate decontamination of the sleeve 10 in use. Then, post-curing the coating 26.

The braiding process is preferably performed by forming tightly braided wall having a pick-per-inch between about 15-25, and more preferably between about 17-20. The yarn used to braid the wall 12 is provided having a high temperature performance rating, such as nomex or some other high temperature rated polymeric yarn material.

Upon braiding the wall 12, method further includes heat-treating the braided wall 12, such as with a flame, to burn off any loose strands of the yarn material and binders on the yarn that are applied in the construction of the yarn, e.g. starches or other processing aids, such as silanes, for example. By removing the loose strands and filaments, the outer surface 14 is smoothed, thereby allowing the subsequently applied coating 26 to fully encapsulate the wall 12 in a smooth fashion, thus, facilitating the ability to fully decontaminate the coating 26 of the sleeve 10 upon being exposed to potentially harmful agents during use without fear of loose, contaminated uncoated strands from remaining present. Further, by burning off the binders, the dielectric and abrasion resistance properties of the finished sleeve 10 are increased by allowing the adhesion of the coating material to the outer surface 14 of the braided wall 12 to be enhanced. Controlling the temperature of the flame and duration of exposure to the flame is important to avoid causing the wall 12 to become overheated and stiff, and wherein too little exposure over too little time fails to remove the binders, thereby resulting in decreased adhesion of the coating 26 to the wall 12, and thus, diminishing the abrasion resistance of the sleeve 10. For example, the flame temperature can be approximately 1200 degree Fahrenheit, and the braided wall 12 can be passed through the flame as a constant rate sufficient to burn the loose strands without stiffening the yarn.

Then, upon heat-treating the wall 12, the method further includes applying a first layer 28 of the coating 26 to the outer surface 14 of the wall 12. The coating material of the first layer 28 is as discussed above, including a base fluorolatex material, a dielectric enhancing additive, provided as barium sulfate, a thickening agent, and a cross-linker enhanced 10× (the cross-liker is available from Whitford Corporation of Elverson, Pa., under the name Eternitex ECM 69-000/D7276 NBC fluoroelastomer cross-linker). The application of the first layer 26 can be performed using a gravity feed system in combination with a round cross-head and die/wiper set-up. The system of application forms the first layer 28 having a wet film thickness of about 0.015", which is controlled by an annular gap space between the die and wiper. Then, upon applying the first layer 28, a vertical tower with air flow at a temperature less than 200 degree Fahrenheit is used to dry the first layer 28 without causing it to blister.

Then, upon drying the first layer 28, the method further includes applying a second layer 30 on top of the first layer 28. The second layer 30 contains a similar formulation as the underlying first layer 28, however, it does not include the thickening agent, and is otherwise the same. The thickening agent is omitted to facilitate forming the total coating layer 26 with the desire outer surface finish and thickness between about 0.012-0.015", and thus, no additional thickener is used. The second layer 30 is applied by dipping the wall 12, with the dried first layer 28 thereon, in the formulation of the second coating layer. The second layer 30 ensures that the coating 26 is impermeable and enhances the abrasion resistance and dielectric resistance, as desired. The method contemplates that a plurality of layers can be applied over the first layer 28 to tailor the dielectric and abrasion resistance, as desired.

Then, upon applying the additional second layer 30, and others, if applied, the coating 26 is cured. A long post-cure is used in the curing process to obtain all the desired properties discussed above. For example, for a 10 mm diameter sleeve, the post-cure should be performed at about 200 degrees Celsius convection heat for about 12 hours.

It is to be understood that the above detailed description is with regard to some presently preferred embodiments, and that other embodiments readily discernible from the disclosure herein by those having ordinary skill in the art are incorporated herein and considered to be within the scope of any ultimately allowed claims.

What is claimed is:

1. A protective textile sleeve, comprising:
   a flexible, tubular wall of braided yarns;
   a fluid impervious coating applied to said wall, said coating being water-based and including a distinct first layer underlying a distinct second layer, said first layer including a dielectric enhancing additive and a thickening agent and said second layer being free of said thickening agent.

2. The protective textile sleeve of claim 1 wherein said braided yarns include high temperature yarn.

3. The protective textile sleeve of claim 2 wherein said high temperature yarn is Nomex.

4. The protective textile sleeve of claim 1 wherein said braided tubular wall has between about 15-25 picks-per-inch.

5. The protective textile sleeve of claim 1 wherein said coating is cured.

6. The protective textile sleeve of claim 1 wherein said dielectric enhancing additive is barium sulfate.

7. The protective textile sleeve of claim 6 wherein said thickening agent is a gum-type thickening agent.

8. The protective textile sleeve of claim 1 wherein said coating is a fluorolatex material.

9. A method of constructing a protective textile sleeve, comprising:
   braiding a tubular wall;
   applying a water-based coating on the wall in at least two separate application steps including applying a first layer having a dielectric enhancing additive and a thickening agent and then, after applying the first layer, applying a second layer containing a dielectric enhancing additive, however, being free of a thickening agent; and
   curing the coating.

10. The method of claim 9 further including heat-treating the tubular wall before applying the water-based coating.

11. The method of claim 10 further including performing the heat-treating with a flame.

12. The method of claim 10 further including drying the first layer before applying the second layer.

13. The method of claim 9 further including adding a cross-linker to the water-based coating.

14. The method of claim 9 further including performing the curing at about 200 degrees Celsius for about 12 hours.

15. The method of claim 9 further including drying the first layer before applying the second layer.

16. The method of claim 9 further including applying the first layer using a gravity feed system in combination with a round cross-head and wiper set-up.

17. The method of claim 16 further including applying the second layer in a dipping process.

* * * * *